United States Patent
Ikada et al.

(10) Patent No.: US 10,533,596 B2
(45) Date of Patent: Jan. 14, 2020

(54) FIBER REINFORCED RESIN SCREW

(71) Applicant: MITSUBISHI HEAVY INDUSTRIES, LTD., Tokyo (JP)

(72) Inventors: Akira Ikada, Tokyo (JP); Naohiro Horie, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 111 days.

(21) Appl. No.: 15/519,706

(22) PCT Filed: Nov. 19, 2015

(86) PCT No.: PCT/JP2015/083300
§ 371 (c)(1),
(2) Date: Apr. 17, 2017

(87) PCT Pub. No.: WO2016/080554
PCT Pub. Date: May 26, 2016

(65) Prior Publication Data
US 2017/0241465 A1    Aug. 24, 2017

(30) Foreign Application Priority Data
Nov. 21, 2014  (JP) ................. 2014-236516

(51) Int. Cl.
*F16B 33/00* (2006.01)
*B29C 45/00* (2006.01)
(Continued)

(52) U.S. Cl.
CPC ........ *F16B 33/006* (2013.01); *B29C 45/0005* (2013.01); *F16B 33/02* (2013.01);
(Continued)

(58) Field of Classification Search
CPC ..................................................... F16B 33/006
(Continued)

(56) References Cited

U.S. PATENT DOCUMENTS 2,949,054 A * 8/1960 White ............... B29C 43/361
156/222
4,909,690 A * 3/1990 Gapp ............... B29C 70/202
411/411

(Continued)

FOREIGN PATENT DOCUMENTS

AU      5768573 A    1/1975
DE      4415195 A1   1/1995
(Continued)

OTHER PUBLICATIONS

Japan Patent Office, "Office Action for Japanese Patent Application No. 2014-236516," dated Jan. 17, 2018.
(Continued)

*Primary Examiner* — Flemming Saether
(74) *Attorney, Agent, or Firm* — Manabu Kanesaka; Benjamin Hauptman; Kenneth Berner (57) ABSTRACT

The present invention is relates to a fiber reinforced resin screw 10, 20 shaped using a resin composition containing reinforcing fiber in a resin. A pitch of threads has a length of 1.5 to 2 times of a standard pitch corresponding to an outer diameter of the threads prescribed in standards of a metric coarse screw, a unified coarse screw and a unified fine screw. An average fiber length of the reinforcing fiber is 1 to 1/3 times of the pitch of the threads in the fiber reinforced resin screw. A content rate of the reinforcing fiber is in a range of 20 to 80%. In this way, the fiber reinforced resin screw to have improved is provided in the strength of the thread.

5 Claims, 7 Drawing Sheets

(51) Int. Cl.
*F16B 33/02* (2006.01)
*B29D 1/00* (2006.01)
*B29K 71/00* (2006.01)
*B29K 105/14* (2006.01)
*B29K 309/08* (2006.01)
*B29L 1/00* (2006.01)

(52) U.S. Cl.
CPC ...... *B29C 2045/0006* (2013.01); *B29D 1/005* (2013.01); *B29K 2071/00* (2013.01); *B29K 2105/14* (2013.01); *B29K 2309/08* (2013.01); *B29L 2001/007* (2013.01)

(58) Field of Classification Search
USPC .................................................. 411/424, 409
See application file for complete search history.

(56) References Cited

U.S. PATENT DOCUMENTS

| | | | | |
|---|---|---|---|---|
| 5,057,257 | A | * | 10/1991 | Neitzke ................. B29C 33/123 156/172 |
| 5,234,765 | A | * | 8/1993 | Taylor ................... B29C 70/086 285/355 |
| 5,437,526 | A | * | 8/1995 | Herbst ....................... E04O 5/07 405/259.5 |
| 6,113,826 | A | * | 9/2000 | Tajima .................. B29C 70/545 156/173 |
| 6,284,831 | B1 | * | 9/2001 | Shimpuku .................. C08J 5/10 524/492 |
| 7,658,581 | B2 | | 2/2010 | Sußenbach |
| 8,465,241 | B2 | * | 6/2013 | Gaw ..................... B29C 70/083 411/424 |
| 8,974,165 | B2 | | 3/2015 | Yumi et al. |
| 9,316,244 | B2 | * | 4/2016 | Jeong .................... B29C 70/083 |
| 2005/0244249 | A1 | | 11/2005 | Sussenbach |
| 2008/0213065 | A1 | | 9/2008 | Sussenbach |
| 2013/0183087 | A1 | | 7/2013 | Weibel et al. |
| 2014/0133936 | A1 | | 5/2014 | Yumi et al. |

FOREIGN PATENT DOCUMENTS

| | | |
|---|---|---|
| JP | S60-201932 A | 10/1985 |
| JP | H01-310941 A | 12/1989 |
| JP | H07-293535 A | 11/1995 |
| JP | 2003-056536 A | 2/2003 |
| JP | 2005-315425 A | 11/2005 |
| JP | 2014-111980 A | 6/2014 |
| WO | 2013/130184 A2 | 9/2013 |

OTHER PUBLICATIONS

PCT, "International Search Report for International Application No. PCT/JP2015/083300" dated Jan. 12, 2016.
PCT/IB/338, "Notification of Transmittal of Translation of the International Preliminary Report on Patentability for International Application No. PCT/JP2015/083300," dated Jun. 1, 2017.
PCT/IB/373, "International Preliminary Report on Patentability for International Application No. PCT/JP2015/083300," dated May 23, 2017.
PCT/ISA/237, "Written Opinion of the International Searching Authority for International Application No. PCT/JP2015/083300," dated Jan. 12, 2016.
PCT/IB/326, "Notification Concerning Transmittal of International Preliminary Report on Patentability for International Application No. PCT/JP2015/083300," dated Jun. 1, 2017.
Europe Patent Office, "Search Report for European Patent Application No. 15862015.3," dated Oct. 26, 2017.

* cited by examiner

FIBER REINFORCED RESIN SCREW

RELATED APPLICATIONS

The present application is National Phase of International Application No. PCT/JP2015/083300 filed Nov. 19, 2015, and claims priority from Japanese Application No. 2014-236516, filed Nov. 21, 2014, the disclosure of which is hereby incorporated by reference herein in its entirety.

TECHNICAL FIELD

The present invention relates to a fiber reinforced resin screw using a resin composition containing reinforcing fiber in a resin.

BACKGROUND ART

Conventionally, in the fields in which chemical resistance, corrosion resistance, biocompatibility, explosion proof property, light weight property, and heat retention are required, a resin screw using a resin as a material is sometimes used in case of carrying out a feeding operation and a fastening operation between articles Because the resin screw has various kinds of characteristics but is weak in strength, as compared with a metal screw, application fields are limited. Therefore, the resin screw could not be used for an application field where the higher strength is required.

Patent Literature 1 (JP H07-293535A) discloses a resin screw in which fiber was mixed to improve tensile strength of the screw. In the resin screw disclosed in Patent Literature 1, long reinforcing fiber having the average fiber length of 0.3 mm or more is mixed in a thermoplastic resin, to enhance the binding and adhesion of the reinforcing fiber and the resin, and to improve the strength of the composite material.

CITATION LIST

[Patent Literature 1] JP H07-293535A

SUMMARY OF THE INVENTION

In the fiber reinforced resin bolt described in Patent Literature 1, the tensile strength of the bolt is improved by strongly orientating long fiber having the average fiber length of 0.3 mm or more in parallel to an axial direction of the screw.

However, even if the tensile strength in the axial direction is improved by containing the long fiber, the strength of the threads sometimes lacks when an engagement length of the male screw and the female screw should be shortened as in case of engaging the male screw and the female screw in a narrower space.

An object of the present invention is to improve the strength of threads in a fiber reinforced resin screw.

A fiber reinforced resin screw of the present invention is a screw formed with a resin composition containing reinforcing fiber in a resin. The pitch of threads of the fiber reinforced resin screw has a length of 1.5 to 2 times of a standard pitch corresponding to the outer diameter of thread prescribed in the standards of a metric coarse screw, a unified coarse screw and a unified fine screw. An average fiber length of the reinforcing fiber is in a range of 1 to 1/3 times of a pitch between the threads in the fiber reinforced resin screw. The content rate of the reinforcing fiber is in a range of 20 to 80%.

A fiber reinforced resin screw of the present invention is a screw formed of a resin composition containing reinforcing fiber in a resin. The pitch between threads in the fiber reinforced resin screw has a length of 1/4.3 to 1/2.2 times of an outer diameter of the screw. The average fiber length of the reinforcing fiber is in a range of 1 to 1/3 times of the pitch. The ratio of the average fiber length of the reinforcing fibers to the outer diameter of the thread ranges from 1/12.9 to 1/2.2. The content rate of the reinforcing fiber is in a range of 20 to 80%.

The angle of thread in the fiber reinforced resin screw is in a range of 60 to 90°.

The outer diameter of the fiber reinforced resin screw is in a range of 3.5 to 10 mm.

The resin is selected from the group consisting of aromatic polyether ketone resin, polyamide resin, polyimide resin, polyphenylene sulfide resin, polyvinylidene fluoride resin, polycarbonate resin, polyacetal resin, phenol resin, ultra-high molecular weight polyethylene resin, tetrafluoroethylene-perfluoralkyl vinyl ether resin, polybutylene terephthalate resin, and polyvinyl chloride resin.

The reinforcing fiber is selected from the group consisting of glass fiber, carbon fiber, silicon carbide fiber, aramid fiber, and ultra-high molecular weight polyethylene fiber.

By using the fiber reinforced resin screw according to the present invention, the resin screw with a high strength of the threads can be provided. By providing the fiber reinforced resin screw with the high strength of threads, the application fields of the resin screw can be increased to the fields requiring chemical resistance, corrosion resistance, biocompatibility, explosion proof property, light weight property, and heat retention.

BRIEF DESCRIPTION OF THE DRAWINGS

(a) of FIG. 3 is a diagram showing an orientation analysis result of the reinforcing fiber in the male screw which corresponds to UNF 3/16 and which has an angle A (=60°) of thread and the pitch P (32 threads/inch), (b) of FIG. 3 is a diagram showing the orientation analysis result of the reinforcing fiber in the male screw which corresponds to UNF 3/16 and which has the angle A (=75°) of thread and the pitch P changed according to the angle A, and (c) of FIG. 3 is a diagram showing an orientation analysis result of the reinforcing fiber in the male screw which corresponds to UNF 3/16 and which has the angle A (=90°) of thread and the pitch P changed according to the angle A.

(a) of FIG. 4 is a diagram showing the orientation analysis result of the reinforcing fiber in the male screw which corresponds to UNF 3/16 and which has the angle A (=60°) of thread and the pitch P (32 threads/inch), (b) of FIG. 4 is a diagram showing the orientation analysis result of the reinforcing fiber in the male screw which corresponds to UNF 3/16 and which has the angle A (=105°) of thread and the pitch P changed according to the angle A, and (c) of FIG. 4 is a diagram showing the orientation analysis result of the reinforcing fiber in the male screw which corresponds to UNF 3/16 and which has the angle A (=120°) and the pitch P changed according to the angle A.

(a) of FIG. 5 is a diagram showing the orientation analysis result of the reinforcing fiber in the male screw which corresponds to UNF 3/16 and which has the angle A (=60°)

of thread and the pitch P (32 threads/inch), and (b) of FIG. 5 is a diagram showing the orientation analysis result of the reinforcing fiber in the male screw which corresponds to UNF 3/16 and which has the pitch P changed to 1.2 times.

(a) of FIG. 6 is a diagram showing the orientation analysis result of the reinforcing fiber in the male screw which corresponds to UNF 3/16 and which has the pitch changed to 1.4 times, and (b) of FIG. 6 is a diagram showing the orientation analysis result of the reinforcing fiber in the male screw which corresponds to UNF 3/16 and which has the pitch P changed to 1.6 times.

(a) of FIG. 7 is a diagram showing the orientation analysis result of the reinforcing fiber in the male screw which corresponds to UNF 3/16 and which has the pitch changed to 1.8 times, and (b) of FIG. 7 is a diagram showing the orientation analysis result of the reinforcing fiber in the male screw which corresponds to UNF 3/16 and which has the pitch P changed to 2 times.

DESCRIPTION OF THE EMBODIMENTS

A fiber reinforced resin screw according to embodiments of the present invention will be described below with reference to the attached drawings.

Figure 1:
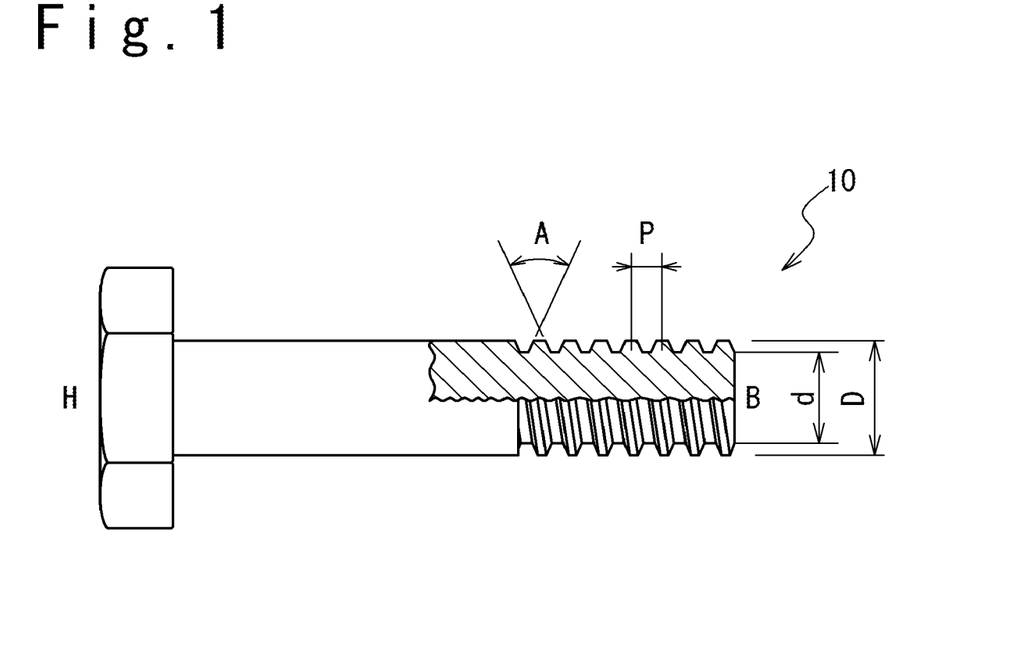
FIG. 1 is a partial sectional view of a fiber reinforced resin screw (a male screw) according to the present invention.
Figure 2:
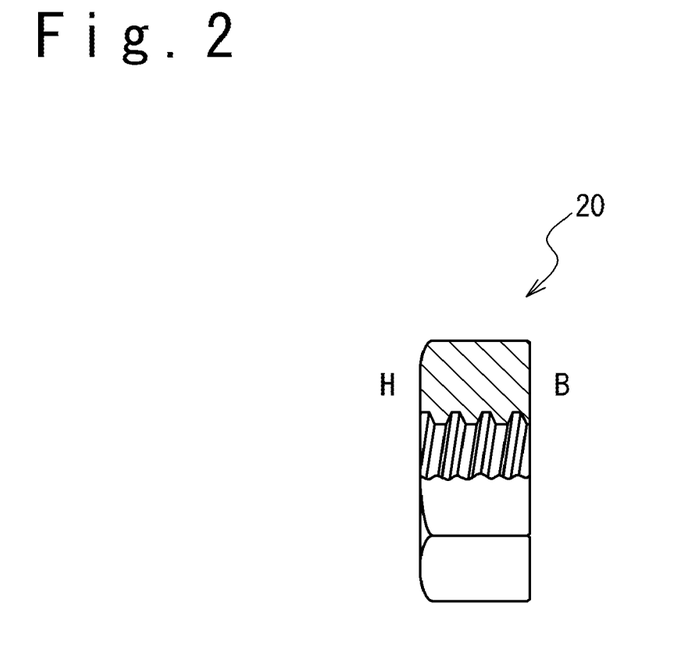
FIG. 2 is a partial sectional view of the fiber reinforced resin screw (a female screw) according to the present invention.

FIG. 1 is a partial sectional view showing a partial section of the fiber reinforced resin screw (a male screw) according to a first embodiment. FIG. 2 is a partial sectional view showing a partial section of the fiber reinforced resin screw (a female screw) according to the first embodiment. Note that since a shape of thread of the female screw shown in FIG. 2 is similar to that of the male screw shown in FIG. 1, the description is omitted.

Referring to FIG. 1 and FIG. 2, the fiber reinforced resin screw 10, 20 according to the first embodiment is a screw which is formed by using a resin composition in which a reinforcing fiber is contained in a resin, and has the outer diameter D in a range of 3.5 mm·D·10 mm. Generally, in the screw with a large outer diameter D, the thread is large and the width of the root section of the thread is wide, so that the strength of the thread becomes stronger. However, in the resin screw with the outer diameter D of 10 mm or less, there is a case that the strength of the thread is lacking.

Here, by setting the pitch P of the fiber reinforced resin screw to be longer than the pitch of the standard screw used generally, the strength of the thread by making a root section of the thread long can be improved.

It is desirable that the pitch P of the fiber reinforced resin screw 10, 20 is in a range of D/4.3 to D/2.2 to the outer diameter D. Also, when the outer diameter D of the thread of the fiber reinforced resin screws 10, 20 is the same as the outer diameter of the thread prescribed in the standards of the metric coarse screw, the unified coarse screw, and the the unified fine screw, it is desirable that the pitch P of the fiber reinforced resin screw 10, 20 is longer than the outer diameter of the thread prescribed in the standards of the unified coarse screw, the unified coarse screw, and the unified fine screw by 1.5 times to 2 times.

When the fiber reinforced resin screw 10, 20 is injection molded, a gate is generally arranged at the head H or bottom B of the screw. At this time, most of the resin composition flows in a direction orthogonal to the direction of the thread. Therefore, in the thread, the flow of the resin composition tends to orientate to an axial direction. Since the entrance width of the resin can be widely taken to the height of the thread when a root section of the thread is set long or wide, the resin fluidity along the shape of the thread can be obtained. Thus, in case of injection molding of the fiber reinforced resin screw 10, 20, the reinforcing fiber contained in the resin composition is orientated along the orientation along the top shape of the thread or the surfaces of the thread top shape to increase the strength to the shearing of the thread. In this way, the resin screw with the high strength of the thread can be obtained.

Also, when the pitch P of the fiber reinforced resin screw 10, 20 is set long and the top (top land) of the thread and/or the bottom (bottom land) between the threads are formed in parallel to the axial direction of the screw and the parallel part is set long in the axial direction, it is possible to set the root section of the thread long. Also, the resin fluidity along the surface of the thread is accomplished so that it is possible to make more reinforcing fiber orientate along the top shape of the thread or the surfaces of the thread top shape. However, if the parallel part is made long too much, the engagement length (a length when the male screw and the female screw are engaged) becomes long too much when the fiber reinforced resin screws 10 and 20 are engaged.

Also, the loosening occurs naturally when the friction angle between the threads of the fiber reinforced resin screws 10 and 20 becomes smaller than a lead angle of the screw. Therefore, it desirable that the pitch P of the fiber reinforced resin screw 10, 20 is set to a range of 1.5 times to 2 times of the standard pitch of the metric coarse screw, the unified coarse screw or the unified fine screw. When the frictional coefficient·of between the threads of the fiber reinforced resin screws 10 and 20 is about 0.1, the lead angle between the threads can be inclined to about 1.8 times to the standard screw.

It is desirable that the average fiber length of the reinforcing fiber contained in the fiber reinforced resin screw 10, 20 is equal to 1 to 1/3 times of the pitch P, or the height of the thread. When the average fiber length is short, the effect of improvement of the tensile strength of the screw in the axial direction and improvement of the thread strength due to containing the reinforcing fiber is hindered. On the other hand, when the average fiber length is too long, the flow of the reinforcing fiber at the time of the injection molding is difficult to be set along the top shape of the thread or the surfaces of the thread top shape, and the strength of the thread is not improved.

The angle A of thread is 60° in the metric coarse screw, the unified coarse screw or the unified fine screw. By setting the angle A of thread in the fiber reinforced resin screw 10, 20 more than the angle A of thread in the general standard screw, the inclination of the thread in the axial direction becomes gentle, and the reinforcing fiber becomes easy to flow along the top shape of the thread or the surfaces of the thread top shape. However, it would be considered that the upper limit of the angle A of thread is about 105° from the independence conditions of the screw. In practice, it is desirable that the angle A of thread is in a range of about 60° or 90°.

In the embodiment shown in FIG. 1 and FIG. 2, the shape of the thread of the fiber reinforced resin screw 10, 20 is trapezoidal. The present invention is not limited to the trapezoid screw and the bottom of the screw may be a U-shaped bottom. Also, although it is desirable that the bottom diameter d is made large to set the root section of the thread long, it is not desirable that the bottom diameter d is made too large, since the height of the thread engagement is decreased.

The raw material of the resin of the fiber reinforced resin screw 10, 20 can be selected the group consisting of aromatic polyether ketone resin (PEEK, PEK, and so on), polyamide resin, polyimide resin, polyphenylene sulfide resin, polyvinylidene fluoride resin, polycarbonate resin, polyacetal resin, phenol resin, ultra-high molecular weight polyethylene resin, tetrafluoroethylene-perfluoroalkyl vinyl ether resin, polybutylene terephthalate resin, polyvinyl chloride resin, other thermosetting resin, and thermoplastic resin, according to an application field of the fiber reinforced resin screw 10, 20.

As the reinforcing fiber, glass fiber, carbon fiber, silicon carbide fiber, aramid fiber, ultra-high molecular weight polyethylene fiber, and other reinforcing fiber can be used. The content of the reinforcing fiber in the fiber reinforced resin screw 10, 20 is desirable to be 20% to 80%, and more desirable to 30% to 60%. Especially, it is desirable to use the reinforcing fiber having non-conductivity such as glass fiber for the application field in which explosion-proof and electrolytic corrosion prevention are required.

Next, referring to FIG. 3 to FIG. 7, a simulation result of the orientation of the reinforcing fiber of the fiber reinforced resin screw (the male screw) having the outer diameter D=about 4.8 mm, based on the flow of the resin at the time of the injection molding will be described. The difference in the color (or the gray level) in FIG. 3 to FIG. 7 shows a probability that the fiber turns to an axial direction (the Y direction). When the value is $9 \cdot 10^-$, it is indicated that 90% of the reinforcing fiber in the part turn to the axial direction (the Y direction).

The gate from which the resin composition containing the reinforcing fiber at the time of injection molding is injected is arranged in the bottom B of the screw. Then, by making the resin composition flow in the axial direction at the time of the injection molding, the tensile strength of fiber reinforced resin screws 10, 20 is improved. Also, the average fiber length of the reinforcing fiber contained in fiber reinforced resin screw 10, 20 is 1 to 1/3 times of the pitch P. The orientation analysis result of the reinforcing fiber in the fiber reinforced resin screw shown in FIG. 3 and FIG. 4 will be described.

Figure 3:
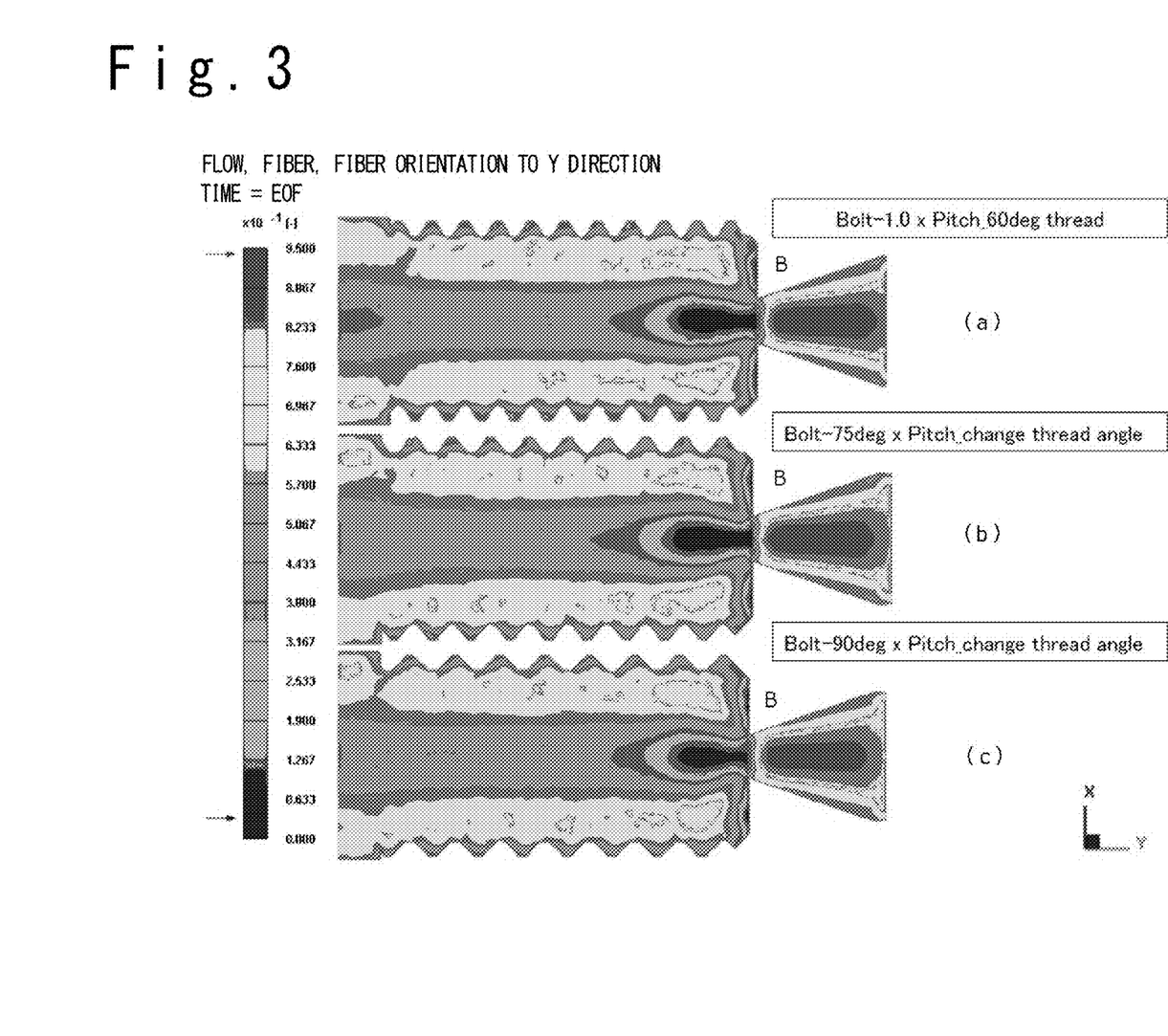

(a) of FIG. 3 is a diagram showing an orientation analysis result of the reinforcing fiber in the male screw which corresponds to UNF 3/16 and which has the angle A (=60°) of thread and the pitch P (32 threads/inch), (b) of FIG. 3 is a diagram showing the orientation analysis result of the reinforcing fiber in the male screw which corresponds to UNF 3/16 and which has the angle A (=75°) of thread and the pitch P changed according to the angle A, and (c) of FIG. 3 is a diagram showing an orientation analysis result of the reinforcing fiber in the male screw which corresponds to UNF 3/16 and which has the angle A (=90°) of thread and the pitch P changed according to the angle A.

Figure 4:
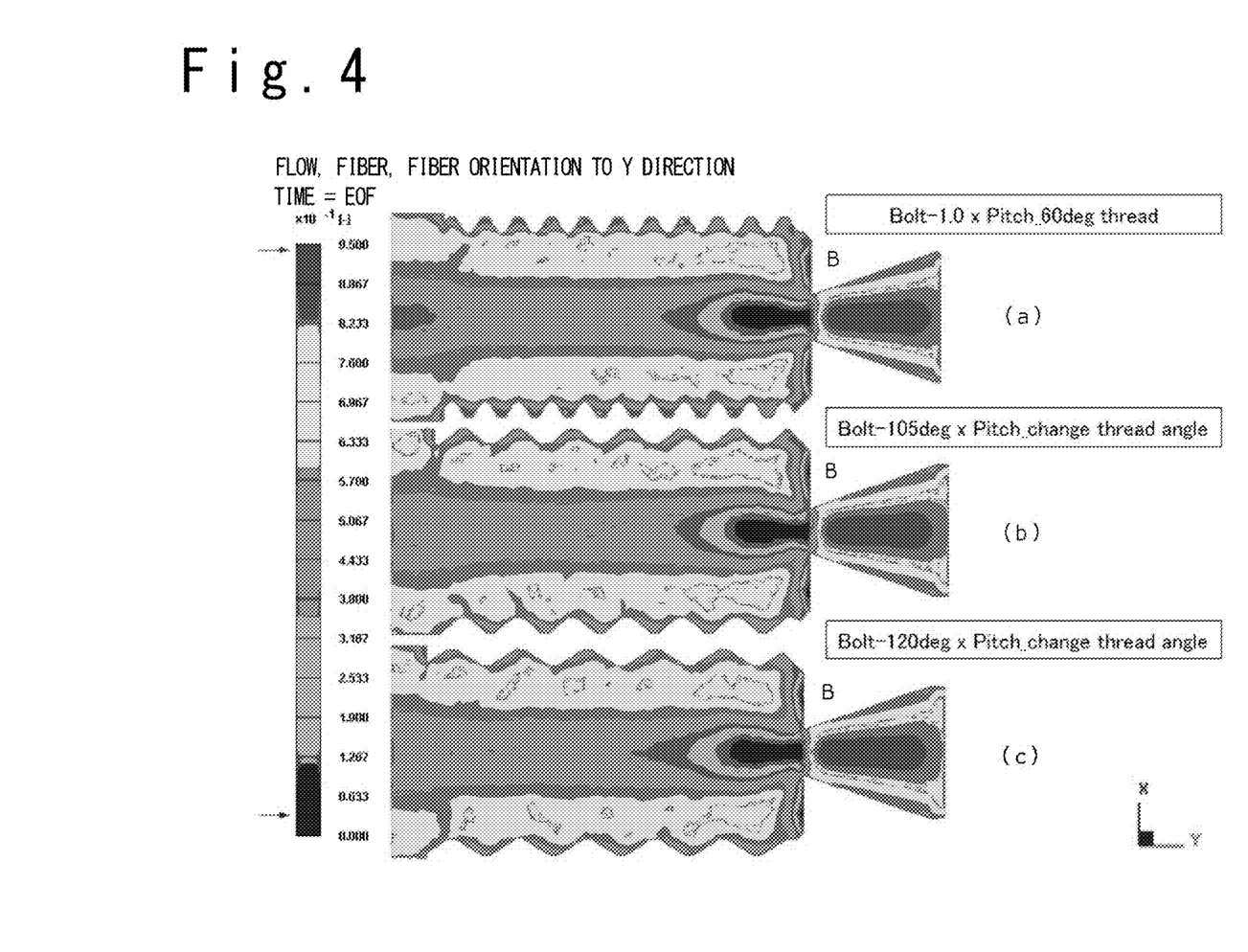

(a) of FIG. 4 is a diagram showing an orientation analysis result of the reinforcing fiber in the male screw which corresponds to UNF 3/16 and which has the angle A (=60°) of thread and the pitch P (32 threads/inch), (b) of FIG. 4 is a diagram showing an orientation analysis result of the reinforcing fiber in the male screw which corresponds to UNF 3/16 and which has the angle A (=105°) and the pitch P changed according to the angle A, and (c) of FIG. 4 is a diagram showing an orientation analysis result of the reinforcing fiber in the male screw which corresponds to UNF 3/16 and which has the angle A (=120°) and the pitch P changed according to the angle A.

As shown in FIG. 3 and FIG. 4, the color boundary goes into the top shape of the thread as the angle A of thread increases. It could be understood that the flow of the reinforcing fiber contained in the resin composition is orientated more strongly along the top shape of the thread. Therefore, it is possible to determine that the strength of the thread is improved. Note that the simulation results shown in FIG. 3 and FIG. 4 are the orientation analysis results of the reinforcing fiber about the fiber reinforced resin screw having the outer diameter D=about 4.8 mm. However, this is met in the same way about the fiber reinforced resin screw having the outer diameter D in the range of 3.5 mm·D·10 mm.

Next, the orientation analysis results of the reinforcing fiber in the fiber reinforced resin screws shown in FIG. 5 to FIG. 7 will be described.

Figure 5:
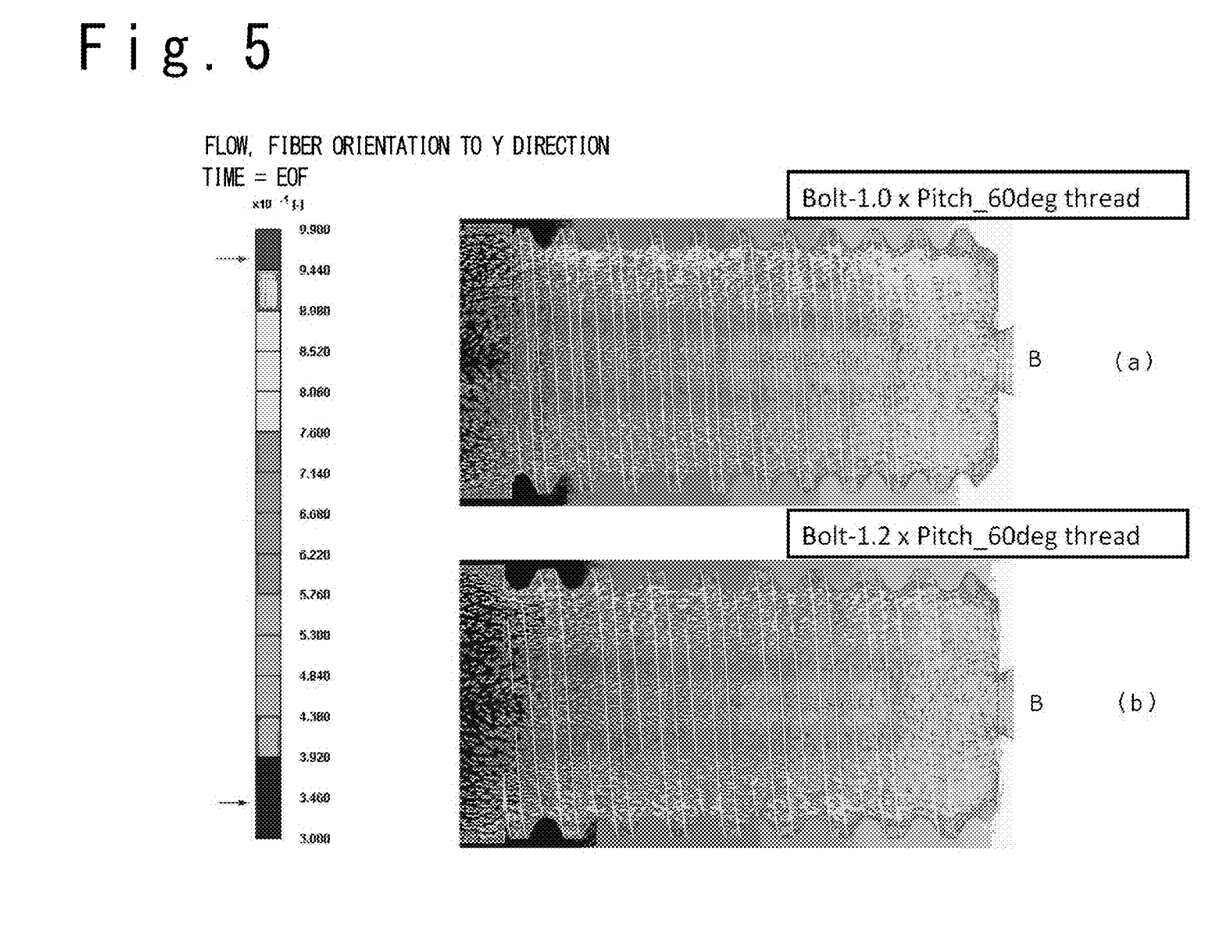

(a) of FIG. 5 is a diagram showing an orientation analysis result of the reinforcing fiber in the male screw which corresponds to UNF 3/16 and which has the angle A (=60°) of thread and the pitch P (32 threads/inch), and (b) of FIG. 5 is a diagram showing the orientation analysis result of the reinforcing fiber in the male screw which corresponds to UNF 3/16 and in which the pitch P is changed to 1.2 times.

Figure 6:
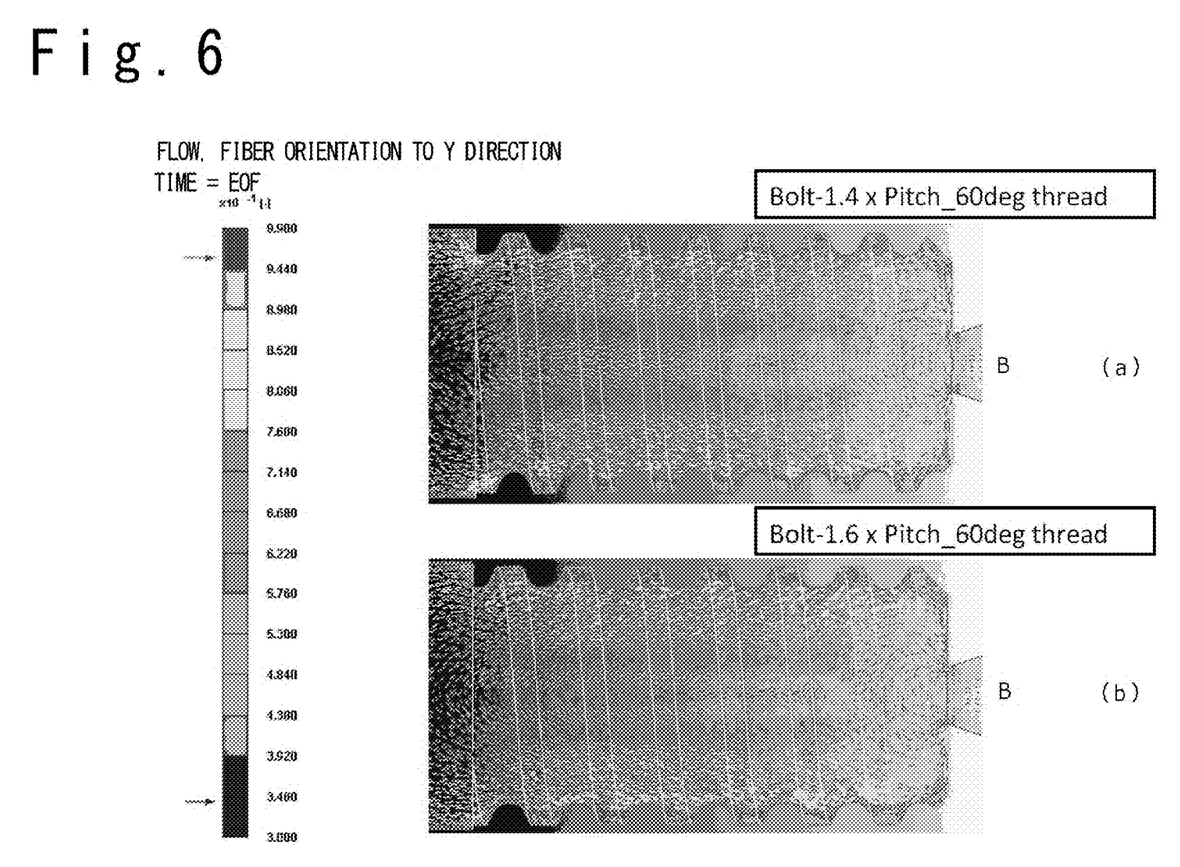

(a) of FIG. 6 is a diagram showing an orientation analysis result of the reinforcing fiber in the male screw which corresponds to UNF 3/16 and in which the pitch is changed to 1.4 times, and (b) of FIG. 6 is a diagram showing an orientation analysis result of the reinforcing fiber in the male screw which corresponds to UNF 3/16 and in which the pitch P is changed to 1.6 times.

Figure 7:
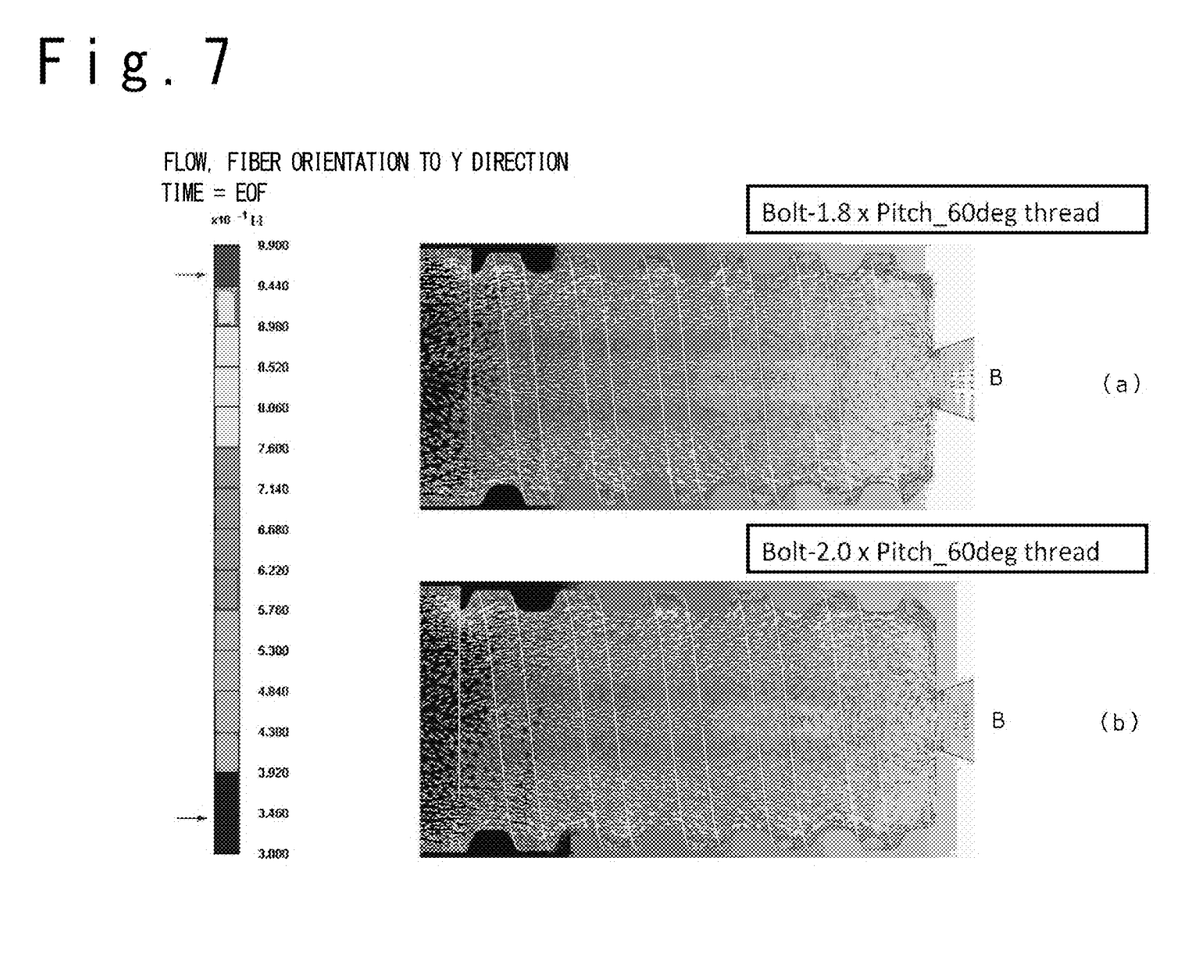

(a) of FIG. 7 is a diagram showing an orientation analysis result of the reinforcing fiber in the male screw which corresponds to UNF 3/16 and in which the pitch is changed to 1.8 times, and (b) of FIG. 7 is a diagram showing an orientation analysis result of the reinforcing fiber in the male screw which corresponds to UNF 3/16 and in which the pitch P is changed to twice.

As shown in FIG. 5 to FIG. 7, the root section of the thread becomes long as the pitch P of the thread increases. Also, it could be understood that the flow of the reinforcing fiber contained in the resin composition is orientated more strongly along the top shape of the thread. Therefore, it is possible to determine that the strength of the thread is improved. Note that the simulation results shown in FIG. 5 to FIG. 7 are the orientation analysis results of the reinforcing fiber about the fiber reinforced resin screws having the outer diameter D=about 4.8 mm, but this is met about the fiber reinforced resin screw having the outer diameter D in the range of 3.5 mm·D·10 mm.

Figure 8:
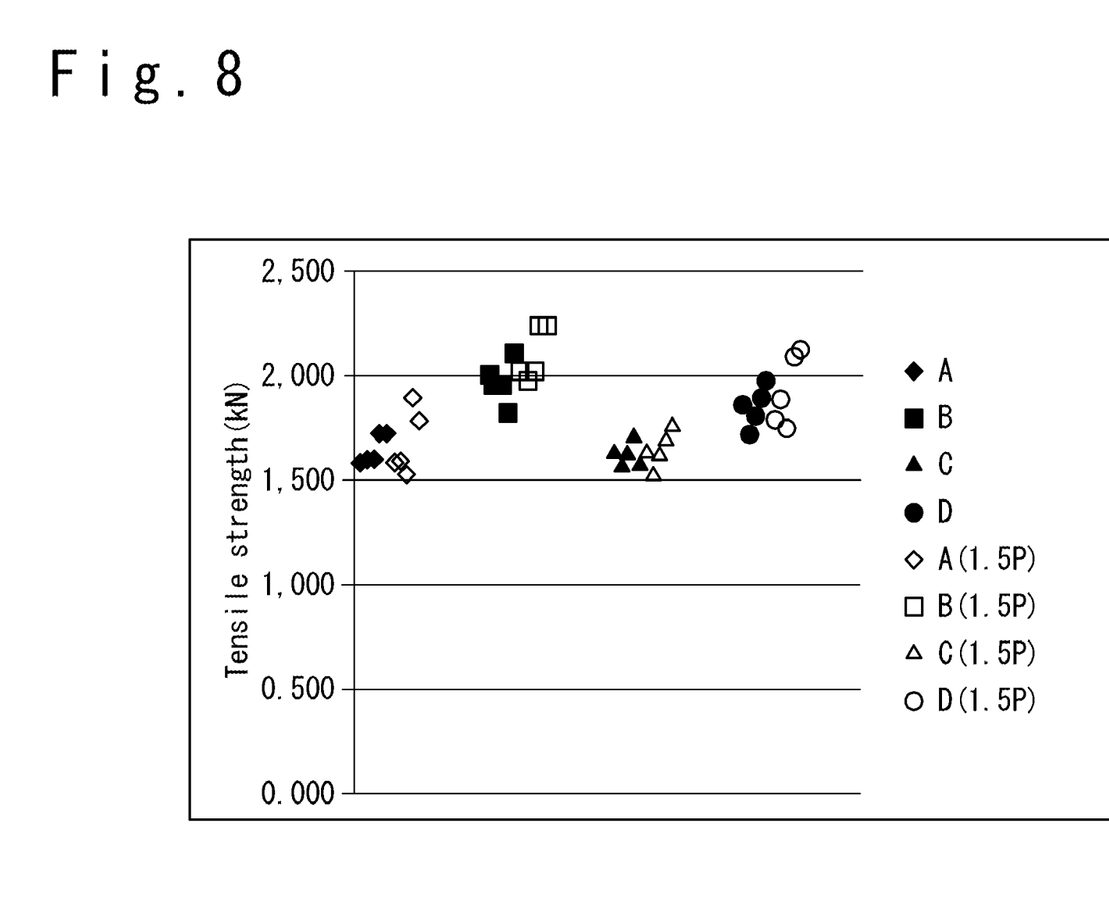
FIG. 8 is a diagram showing a change of tensile strength (kN) of the fiber reinforced resin screw when the content rate of the reinforcing fiber and the resin is changed.

The examination result of tensile strength in the condition that the fiber reinforced resin screws 10 and 20 shown in FIG. 1 and FIG. 2 are engaged will be described with reference to FIG. 8. FIG. 8 is a diagram showing the change of the tensile strength when the content rate of the resin and the reinforcing fiber is changed about the fiber reinforced resin screw 10 having the outer diameter D D=about 4.8 mm. The vertical axis of FIG. 8 is the tensile strength (kN).

The symbol A of the material shows the resin composition which uses high viscosity PEEK (polyether etherketone) as the resin and which contains the glass fiber of 30% as the reinforcing fiber. The symbol B of the material shows the resin composition which uses low viscosity PEEK as the resin and which contains the glass fiber of 60% as the reinforcing fiber. The symbol C of the material shows the resin composition which uses intermediate viscosity PEEK as the resin and which contains the glass fiber of 30% as the reinforcing fiber. The symbol D of the material shows the resin composition which uses low viscosity PEEK as the resin and which contains the glass fiber of 50% as the reinforcing fiber.

The measurement results of the symbols A, B, C, and D are the tensile strength examination results about thee fiber reinforced resin screw 10, 20 which corresponds to UNF 3/16 and which has the angle A) (60°) of thread and the pitch P (32 piles/the inch). To these, the symbols A (1.5 P), B (1.5 P), C (1.5 P) and D (1.5 P) shows the tensile strength examination results about fiber reinforced resin screws 10, 20 which corresponds to UNF 3/16 and which has the angle) A(60°) of thread, and the pitch P (21 piles/the inch).

As shown in FIG. 8, it could be seen that the average tensile strength is improved (about 4 to 10%) by setting the average fiber length of the reinforcing fiber contained in the fiber reinforced resin screw 10, 20 to 1 to 1/3 times of the pitch P and making the pitch P of the thread long.

In the above, the fiber reinforced resin screws of various embodiments have been described but the present invention is not limited to the above embodiments. Various modifications can be carried out to the above embodiments. In the range in which technical contradiction does not occur, the technical matter in one embodiment can be combined with the technical matter in another embodiment.

The invention claimed is:

1. A fiber reinforced resin screw formed from a resin composition containing reinforcing fibers in a resin,
   wherein a pitch of a thread of the fiber reinforced resin screw has a length of 1/4.3 to 1/2.2 times of an outer diameter of the thread,
   wherein an average fiber length of the reinforcing fibers is 1 to 1/3 times of the pitch,
   wherein a content rate of the reinforcing fibers is in a range of 20 to 80%,
   wherein the reinforcing fibers contained in the resin composition are orientated along a top surface of the thread or side surfaces of the thread, and
   wherein a ratio of the average fiber length of the reinforcing fibers to the outer diameter of the thread ranges from 1/12.9 to 1/2.2.

2. The fiber reinforced resin screw according to claim 1, wherein an angle of the thread of the fiber reinforced resin screw is in a range of 60 to 90°.

3. The fiber reinforced resin screw according to claim 1, wherein an outer diameter of the thread is in a range of 3.5 to 10 mm.

4. The fiber reinforced resin screw according to claim 1, wherein the resin is selected from the group consisting of aromatic polyether ketone resin, polyamide resin, polyimide resin, polyphenylene sulfide resin, polyvinylidene fluoride resin, polycarbonate resin, polyacetal resin, phenol resin, ultra-high molecular weight polyethylene resin, tetrafluoroethylene-perfluoralkyl vinyl ether resin, polybutylene terephthalate resin, and polyvinyl chloride resin.

5. The fiber reinforced resin screw according to claim 1, wherein the reinforcing fibers are selected from the group consisting of glass fibers, carbon fibers, silicon carbide fibers, aramid fibers, and ultra-high molecular weight polyethylene fibers.

* * * * *